United States Patent
Fischer et al.

(10) Patent No.: US 9,531,020 B2
(45) Date of Patent: Dec. 27, 2016

(54) METHOD OF OPERATING A HEATER

(71) Applicant: DELPHI TECHNOLOGIES, INC., Troy, MI (US)

(72) Inventors: Bernhard A. Fischer, Honeoye Falls, NY (US); James D. Richards, Spencerport, NY (US)

(73) Assignee: Delphi Technologies, Inc., Troy, MI (US)

( * ) Notice: Subject to any disclaimer, the term of this patent is extended or adjusted under 35 U.S.C. 154(b) by 178 days.

(21) Appl. No.: 14/081,068

(22) Filed: Nov. 15, 2013

(65) Prior Publication Data

US 2015/0140461 A1 May 21, 2015

(51) Int. Cl.
*H01M 8/04* (2006.01)
*H01M 8/24* (2016.01)
*E21B 36/02* (2006.01)

(52) U.S. Cl.
CPC ..... *H01M 8/04268* (2013.01); *H01M 8/04022* (2013.01); *H01M 8/24* (2013.01); *E21B 36/02* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 6,033,793 A * | 3/2000 | Woods | F23D 11/443 123/169 EA |
| 6,684,948 B1 | 2/2004 | Savage | |
| 6,720,099 B1 | 4/2004 | Haltiner, Jr. | |
| 7,182,132 B2 | 2/2007 | Savage | |
| 2001/0049039 A1 | 12/2001 | Haltiner, Jr. | |
| 2003/0196814 A1 | 10/2003 | Zhang et al. | |
| 2004/0200605 A1 | 10/2004 | Yoshida et al. | |
| 2004/0229096 A1 * | 11/2004 | Standke | H01M 8/04022 429/436 |
| 2005/0224258 A1 | 10/2005 | Fincher et al. | |
| 2006/0147771 A1 * | 7/2006 | Russell | H01M 8/04022 429/425 |
| 2007/0048685 A1 * | 3/2007 | Kuenzler | F23D 14/78 431/328 |

(Continued)

OTHER PUBLICATIONS

"Phase 1 Report, Geothermic Fuel Cell In-Situ Applications for Recovery of Unconventional Hydrocarbons"; Independent Energy Partners; Title: Geothermic Fuel Cells: Phase 1 Report.

*Primary Examiner* — Miriam Stagg
*Assistant Examiner* — Haroon S Sheikh
(74) *Attorney, Agent, or Firm* — Joshua M. Haines

(57) ABSTRACT

A method is provided for operating a heater including a heater housing extending along a heater axis; a plurality of fuel cell stack assemblies disposed within the heater housing along the heater axis and having a plurality of fuel cells which convert chemical energy from a fuel cell fuel into heat and electricity through a chemical reaction with a fuel cell oxidizing agent; and a plurality of combustors disposed within the heater housing along the heater axis. The method includes supplying a combustor fuel to the plurality of combustors, combusting the combustor fuel to produce a heated combustor exhaust when the fuel cell stack assemblies are substantially electrochemically inactive, and using the heated combustor exhaust to elevate the temperature of the fuel cell stack assemblies to be electrochemically active.

10 Claims, 3 Drawing Sheets

(56) References Cited

U.S. PATENT DOCUMENTS

2010/0163226 A1 7/2010 Zornes
2012/0094201 A1 4/2012 Haltiner, Jr. et al.
2012/0103604 A1 5/2012 Mohamed et al.
2013/0008660 A1 1/2013 de Rouffignac et al.

* cited by examiner

METHOD OF OPERATING A HEATER

TECHNICAL FIELD OF INVENTION

The present invention relates to a heater which uses a plurality of combustors for combusting a fuel as a source of heat; more particularly to such a heater which also uses a plurality of fuel cell stack assemblies as a source of heat; even more particularly to such a heater which is positioned within a bore hole of an oil containing geological formation in order to liberate oil therefrom; and still even more particularly to such a heater which uses only one igniter to initiate combustion of the fuel in each of the combustors where the combustors are used to elevate the temperature of the fuel cell stack assemblies to an electrochemically active temperature.

BACKGROUND OF INVENTION

Subterranean heaters have been used to heat subterranean geological formations in oil production, remediation of contaminated soils, accelerating digestion of landfills, thawing of permafrost, gasification of coal, as well as other uses. Some examples of subterranean heater arrangements include placing and operating electrical resistance heaters, microwave electrodes, gas-fired heaters or catalytic heaters in a bore hole of the formation to be heated. Other examples of subterranean heater arrangements include circulating hot gases or liquids through the formation to be heated, whereby the hot gases or liquids have been heated by a burner located on the surface of the earth. While these examples may be effective for heating the subterranean geological formation, they may be energy intensive to operate.

U.S. Pat. Nos. 6,684,948 and 7,182,132 propose subterranean heaters which use fuel cells as a more energy efficient source of heat. The fuel cells are disposed in a heater housing which is positioned within the bore hole of the formation to be heated. The fuel cells convert chemical energy from a fuel into heat and electricity through a chemical reaction with an oxidizing agent. U.S. Pat. No. 7,182,132 teaches that in order to start operation of the heater, an electric current may be passed through the fuel cells in order to elevate the temperature of the fuel cells sufficiently high to allow the fuel cells to operate, i.e. an electric current is passed through the fuel cells before the fuel cells are electrically active. While passing an electric current through the fuel cells may elevate the temperature of the fuel cells, passing an electric current through the fuel cells before the fuel cells are electrically active may be harsh on the fuel cells and may lead to a decreased operational life thereof.

U.S. patent application Ser. No. 14/013,708 to Fischer et al., the disclosure of which is incorporated herein by reference in its entirety, teaches a subterranean heater which uses fuel cells and combustors to heat a geological formation. The fuel cells and combustors are disposed in a heater housing in an alternating pattern and are operated to heat the heater housing, and consequently the geological formation. U.S. patent application Ser. No. 14/013,879 to Haltiner et al., the disclosure of which is incorporated herein by reference in its entirety, teaches a subterranean heater which uses fuel cells to heat a geothermic formation where an arrangement of electric resistance heating elements are used to elevate the temperature of the fuel cells from an inactive temperature to an active temperature. While using electric resistance heating elements may be effective to elevate the temperatures of the fuel cells from the inactive temperature to the active temperature, the electric resistance heating elements may add cost and complexity to the system.

What is needed is a heater which minimizes or eliminates one or more of the shortcomings as set forth above.

SUMMARY OF THE INVENTION

A method is provided for operating a heater including a heater housing extending along a heater axis; a plurality of fuel cell stack assemblies disposed within the heater housing along the heater axis and having a plurality of fuel cells which convert chemical energy from a fuel cell fuel into heat and electricity through a chemical reaction with a fuel cell oxidizing agent; and a plurality of combustors disposed within the heater housing along the heater axis. The method includes supplying a combustor fuel to the plurality of combustors, combusting the combustor fuel to produce a heated combustor exhaust when the fuel cell stack assemblies are at an inactive temperature where the fuel cell stack assemblies are substantially electrochemically inactive, and using the heated combustor exhaust to elevate the temperature of the fuel cell stack assemblies from the inactive temperature to an active temperature where the fuel cell stack assemblies are electrochemically active. This method allows operation of the fuel cell stack assemblies to be initiated without the need for electric resistance heaters.

A method is also provided for operating a heater including a heater housing extending along a heater axis from a first end to a second end; a plurality of combustors disposed within the heater housing along the heater axis; and an igniter. The method includes supplying a combustor fuel having a turbulent flame velocity to each one of the plurality of combustors at a flow rate that produces a fuel velocity of the combustor fuel that is less than the turbulent flame velocity and using the igniter and the combustor fuel to initiate a flame at the first end of the heater housing. This method allows controlled initiation combustors using an igniter that is easily accessed for service.

BRIEF DESCRIPTION OF DRAWINGS

This invention will be further described with reference to the accompanying drawings in which.

DETAILED DESCRIPTION OF INVENTION

Figure 1:
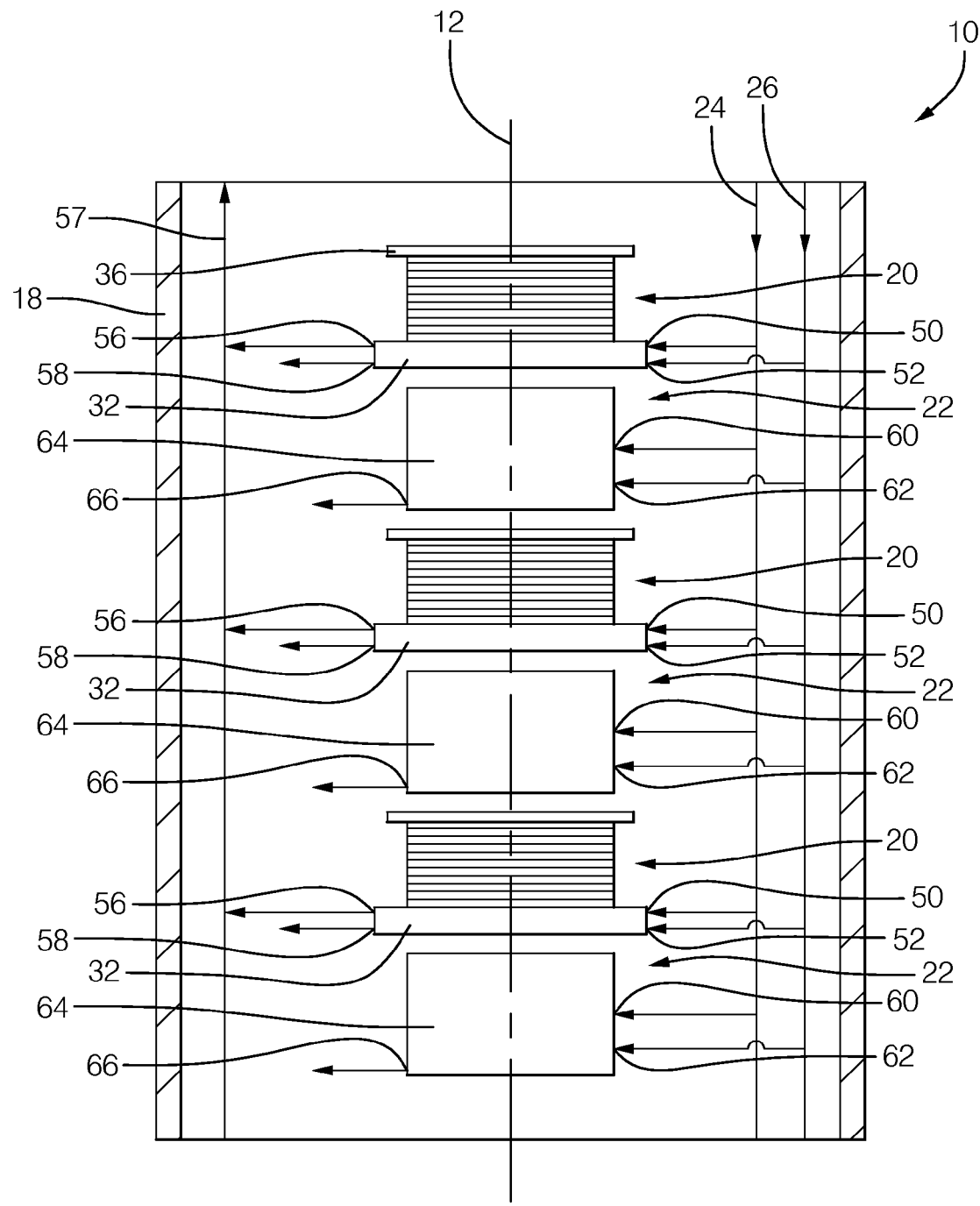
FIG. 1 is a schematic of a heater in accordance with the present invention.
Figure 2:
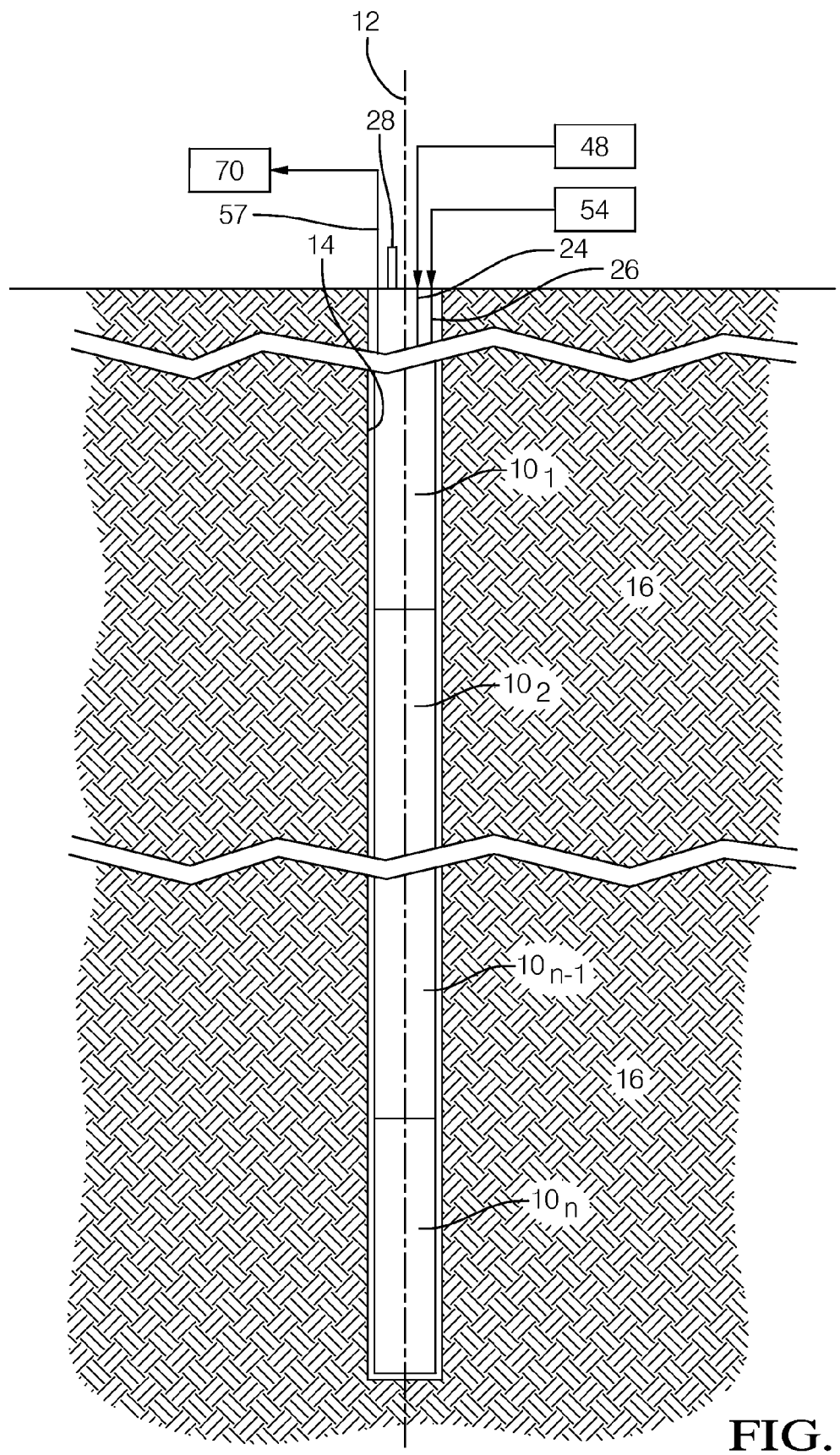
FIG. 2 is a schematic of a plurality of heaters of FIG. 1 shown in a bore hole of a geological formation.

Referring now to FIGS. 1 and 2, a heater 10 extending along a heater axis 12 is shown in accordance with the present invention. A plurality of heaters $10_1, 10_2, \ldots 10_{n-1}, 10_n$, where n is the total number of heaters 10, may be connected together end to end within a bore hole 14 of a formation 16, for example, an oil containing geological formation, as shown in FIG. 2. Bore hole 14 may be only a few feet deep; however, may typically be several hundred feet deep to in excess of one thousand feet deep. Consequently, the number of heaters 10 needed may range from 1 to several hundred. It should be noted that the oil containing geological formation may begin as deep as one thousand feet below the surface and consequently, heater $10_1$ may be located sufficiently deep within bore hole 14 to be positioned near the beginning of the oil containing geological formation. When this is the case, units without active heating components may be positioned from the surface to heater $10_1$ in order to provide plumbing, power leads, and instrumentation leads to support and supply fuel and air to heaters $10_1$ to $10_n$.

Heater 10 generally includes a heater housing 18 extending along heater axis 12, a plurality of fuel cell stack assemblies 20 located within heater housing 18 such that each fuel cell stack assembly 20 is spaced axially apart from each other fuel cell stack assembly 20, a plurality of combustors 22 located within heater housing 18 such that combustors 22 and fuel cell stack assemblies 20 are arranged in an alternating pattern, a fuel supply conduit 24 for supplying fuel to fuel cell stack assemblies 20 and combustors 22, and an oxidizing agent supply conduit 26; hereinafter referred to as air supply conduit 26; for supplying an oxidizing agent, for example air, to fuel cell stack assemblies 20 and combustors 22. A single igniter 28 may be provided for starting combustors 22 in each heater $10_1$, $10_2$, ... $10_{n-1}$, $10_n$ as will be described in greater detail later. While heater 10 is illustrated with three fuel cell stack assemblies 20 and three combustors 22 within heater housing 18, it should be understood that a lesser number or a greater number of fuel cell stack assemblies 20 and/or combustors 22 may be included. The number of fuel cell stack assemblies 20 within heater housing 18 may be determined, for example only, by one or more of the following considerations: the length of heater housing 18, the heat output capacity of each fuel cell stack assembly 20, the desired density of fuel cell stack assemblies 20 and/or combustors 22 (i.e. the number of fuel cell stack assemblies 20 and/or combustors 22 per unit of length), and the desired heat output of heater 10. The number of heaters 10 within bore hole 14 may be determined, for example only, by one or more of the following considerations: the depth of formation 16 which is desired to be heated, the location of oil within formation 16, and the length of each heater 10.

Heater housing 18 may be substantially cylindrical and hollow and may support fuel cell stack assemblies 20 and combustors 22 within heater housing 18. Heater housing 18 of heater $10_x$, where x is from 1 to n where n is the number of heaters 10 within bore hole 14, may support heaters $10_{x+1}$ to $10_n$ by heaters $10_{x+1}$ to $10_n$ hanging from heater $10_x$. Consequently, heater housing 18 may be made of a material that is substantially strong to accommodate the weight of fuel cell stack assemblies 20 and heaters $10_{x+1}$ to $10_n$. The material of heater housing 18 may also have properties to withstand the elevated temperatures, for example 600° C. to 900° C., as a result of the operation of fuel cell stack assemblies 20 and combustors 22. For example only, heater housing 18 may be made of a 300 series stainless steel with a wall thickness of 3/16 of an inch.

Figure 3:
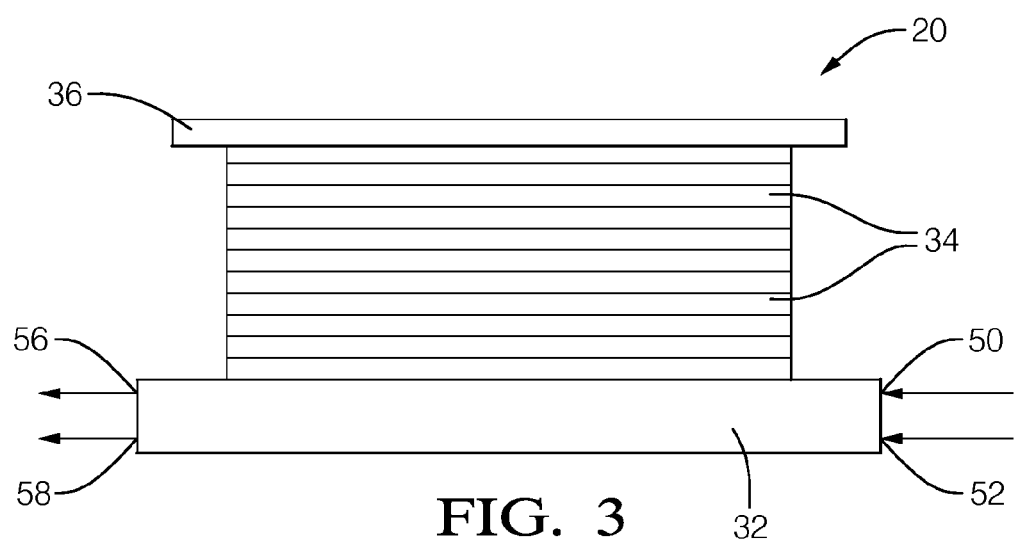
FIG. 3 is a schematic of a fuel cell stack assembly of the heater of FIG. 1.

With continued reference to FIGS. 1 and 2 and now with additional reference to FIG. 3, fuel cell stack assemblies 20 may be, for example only, solid oxide fuel cells which generally include a fuel cell manifold 32, a plurality of fuel cell cassettes 34 (for clarity, only select fuel cell cassettes 34 have been labeled), and a fuel cell end cap 36. Fuel cell cassettes 34 are stacked together between fuel cell manifold 32 and fuel cell end cap 36 in compression. Each fuel cell stack assembly 20 may include, for example only, 20 to 50 fuel cell cassettes 34.

Figure 4:
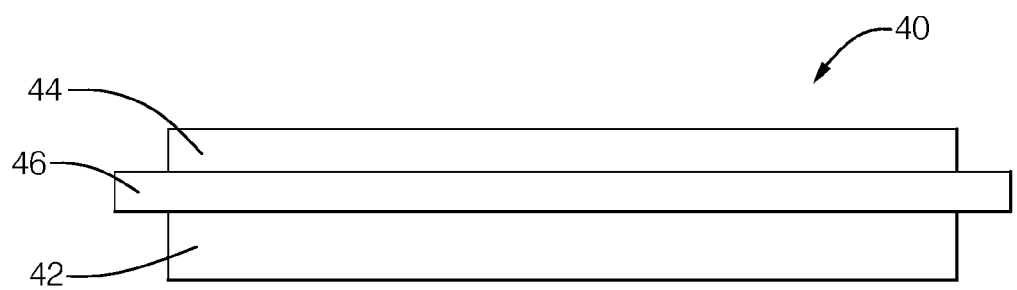
FIG. 4 is a schematic of a fuel cell of the fuel cell stack assembly of FIG. 3.

With continued reference to FIGS. 1-3 and now with additional reference to FIG. 4, each fuel cell cassette 34 includes a fuel cell 40 having an anode 42 and a cathode 44 separated by a ceramic electrolyte 46. Each fuel cell 40 converts chemical energy from a fuel cell fuel supplied to anode 42 into heat and electricity through a chemical reaction with air supplied to cathode 44. Fuel cell stack assemblies 20, more particularly fuel cells 40, have no electrochemical activity below a first temperature, for example, about 500° C., and consequently will not produce heat and electricity below the first temperature. Fuel cell stack assemblies 20 have a very limited electrochemical activity between the first temperature and a second temperature; for example, between about 500° C. and about 700° C., and consequently produce limited heat and electricity between the first temperature and the second temperature, for example only, about 0.01 kW to about 3.0 kW of heat (due to the fuel self-igniting above about 600° C.) and about 0.01 kW to about 0.5 kW electricity for a fuel cell stack assembly having thirty fuel cell cassettes 34. When fuel cell stack assemblies 20 are elevated above the second temperature, for example, about 700° C. which is considered to be the active temperature (a temperature below the active temperature is considered to be the inactive temperature), fuel cell stack assemblies 20 are considered to be active and produce desired amounts of heat and electricity, for example only, about 0.5 kW to about 3.0 kW of heat and about 1.0 kW to about 1.5 kW electricity for a fuel cell stack assembly having thirty fuel cell cassettes 34. Further features of fuel cell cassettes 34 and fuel cells 40 are disclosed in United States Patent Application Publication No. US 2012/0094201 to Haltiner, Jr. et al., the disclosure of which is incorporated herein by reference in its entirety.

Now again with reference to FIGS. 1-2, fuel cell manifold 32 receives fuel, e.g. a hydrogen rich reformate which may be supplied from a fuel reformer 48, through a fuel cell fuel inlet 50 from fuel supply conduit 24 and distributes the fuel to each of the fuel cell cassettes 34. Fuel cell manifold 32 also receives an oxidizing agent, for example, air from an air supply 54, through a fuel cell air inlet 52 from air supply conduit 26. Fuel cell manifold 32 also receives anode exhaust, i.e. spent fuel and excess fuel from fuel cells 40 which may comprise $H_2$, CO, $H_2O$, $CO_2$, and $N_2$, and discharges the anode exhaust from fuel cell manifold 32 through an anode exhaust outlet 56 which is in fluid communication with an anode exhaust return conduit 57 which will be discussed in greater detail later. Fuel cell manifold 32 also receives cathode exhaust, i.e. spent air and excess air from fuel cells 40 which may comprise $O_2$ (depleted compared to the air supplied through air supply conduit 26) and $N_2$, and discharges the cathode exhaust from fuel cell manifold 32 through a cathode exhaust outlet 58 into heater housings 18.

Figure 5:
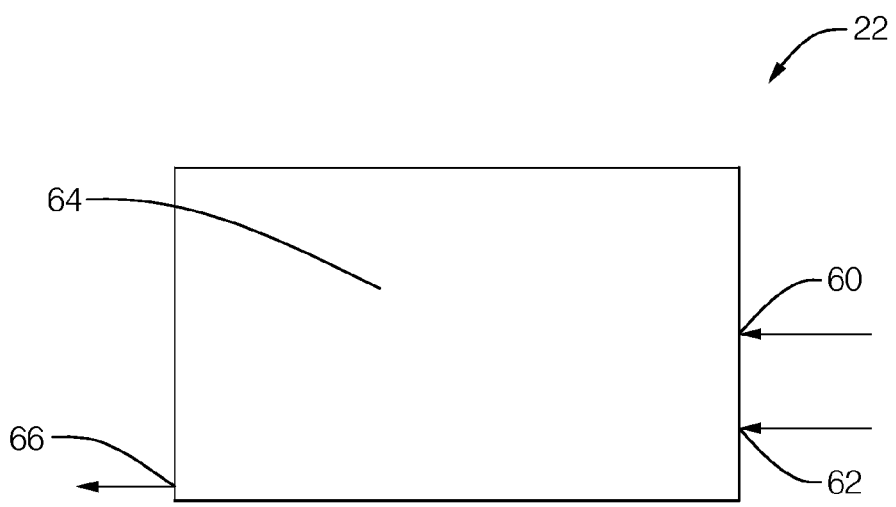
FIG. 5 is a schematic of a combustor of the heater of FIG. 1.

With continued reference to FIGS. 1 and 2 and now with additional reference to FIG. 5, each combustor 22 may include a combustor fuel inlet 60, a combustor oxidizing agent inlet 62, a combustion chamber 64, and a combustor exhaust outlet 66. Each combustor 22 may receive a combustor fuel through combustor fuel inlet 60. The combustor fuel is supplied to combustor 22 from fuel supply conduit 24 which also supplies the fuel cell fuel to fuel cell stack assemblies 20. Each combustor 22 may also receive a combustor oxidizing agent, for example air, through combustor oxidizing agent inlet 62. The combustor oxidizing agent is supplied to combustor 22 from air supply conduit 26 which also supplies the fuel cell oxidizing agent to fuel cell stack assemblies 20. The combustor fuel and the combustor oxidizing agent are mixed within combustion chamber 64 to form a combustible mixture which is combusted to form a heated combustor exhaust. The heated combustor exhaust is discharged from combustor 22 through combustor exhaust outlet 66 into heater housing 18. In addition to the heated combustor exhaust from combustors 22 being used to elevate the temperature of formation 16, the heated combustor exhaust is also used to elevate fuel cell stack assemblies 20 to the active temperature, which as mentioned previously is about 700° C. In order to elevate fuel cell stack assemblies 20 to the active temperature, the heated combustor exhaust surrounds fuel cell stack assemblies 20, thereby directly heating fuel cell stack assemblies 20.

In operation, after heaters 10 are installed within bore hole 14, fuel cell stack assemblies 20 must be elevated to the active temperature before fuel cell stack assemblies 20 may be used to generate heat and electricity. In order to elevate fuel cell stack assemblies 20 to the active temperature, operation of combustors 22 may first be initiated in order to produce the heated combustor exhaust which is discharged into heater housing 18. Operation of combustors 22 is initiated by first supplying the combustor fuel and the combustor oxidizing agent to combustors 22 through fuel supply conduit 24 and air supply conduit 26 respectively. The combustor fuel is supplied to combustors 22 at a flow rate that produces a fuel velocity that is less than a turbulent flame velocity of the combustor fuel. As used herein, turbulent flame velocity is the velocity of the combustor fuel at which the flame produced by ignition of the combustor fuel begins to wrinkle and increasing velocity of the fuel above the turbulent flame velocity causes the flame to corrugate and eventually the flame front will be broken and transportation properties are enhanced by turbulent eddies in the flame zone. The turbulent flame velocity may vary by composition of the fuel, consequently, the composition of the fuel must be considered when determining the flow rate that is needed. The combustor fuel, which migrates upward through the plurality of heaters $10_1, 10_2, \ldots 10_{n-1}, 10_n$ to the top of bore hole 14, is then ignited by igniter 28 which is located at one end of the plurality of heaters $10_1, 10_2, \ldots 10_{n-1}, 10_n$; preferably at or near the surface of formation 16. Igniter 28 may be any type of igniter known to be used for igniting a combustible mixture, for example only, spark plugs, piezoelectric igniters, hot wire igniters, pilot lights, etc. Igniter 28 initiates a flame at one end of the plurality of heaters $10_1, 10_2, \ldots 10_{n-1}, 10_n$ which then propagates to the other end of the plurality of heaters $10_1, 10_2, \ldots 10_{n-1}, 10_n$, consequently, the flame propagates from a first end of each heater housing 18 to a second end thereof. As the flame propagates through the plurality of heaters $10_1, 10_2, \ldots 10_{n-1}, 10_n$; combustion is initiated at each combustor 22. Since the combustor fuel is supplied to combustors 22 at a flow rate that produces a fuel velocity below the turbulent flame velocity of the combustor fuel, the flame propagates through the plurality of heaters $10_1, 10_2, \ldots 10_{n-1}, 10_n$ at a rate that is preferably between about 1 m/s and about 10 m/s. Propagation of the flame using this method prevents uncontrolled pressure waves in the plurality of heaters $10_1, 10_2, \ldots 10_{n-1}, 10_n$; thereby preventing damage to components of heaters 10. After combustion has been initiated in each combustor 22, the flow rate of the combustor fuel to combustors 22 may be increased in order to more rapidly produce the heated combustor exhaust which is discharged into heater housings 18 where the heated combustor exhaust surrounds fuel cell stack assemblies 20 to directly heat fuel cell stack assemblies 20. Using this method also requires only one igniter 28. Furthermore, igniter 28 may be located at or near the surface of formation 16 where igniter 28 is easily accessed for service or replacement when compared to placing igniters at each combustor 22. While the method of initiating operation of combustors 22, e.g. igniting combustors 22, has been described in a system which includes fuel cell stack assemblies 20, it should now be understood that this method may also be used in heaters which use only combustors 22.

After combustors 22 have elevated fuel cell stack assemblies 20 to the active temperature, fuel cell stack assemblies 20 carry out a chemical reaction between the fuel and air, causing fuel cell stack assemblies 20 to be elevated in temperature, for example, up to about 900° C. Anode exhaust from fuel cell stack assemblies 20 is sent to anode exhaust return conduit 57 while cathode exhaust from fuel cell stack assemblies 20 is discharged into heater housing 18. Anode exhaust return conduit 57 communicates the anode exhaust out of heaters 10, e.g. out of bore hole 14, where the anode exhaust may be utilized by an anode exhaust utilization device 70 which may be used, for example only, to produce steam, drive compressors, or supply a fuel reformer. The combustor fuel and the combustor air is continued to be supplied to combustors 22 where the combustor fuel and the combustor air is mixed and combusted to form a heated combustor exhaust which is discharged into heater housing 18. Consequently, fuel cell stack assemblies 20 together with the heated combustor exhaust elevate the temperature of heater housing 18 which subsequently elevates the temperature of formation 16.

While fuel cell stack assemblies 20 and combustors 22 have been described as receiving fuel and air from the same fuel supply conduit 24 and air supply conduit 26 respectively, it should now be understood that fuel cell stack assemblies 20 and combustors 22 may receive fuel and air from their own distinct supplies. It should also be understood that combustors 22 may alternatively receive fuel and/or air in the form of anode exhaust and cathode exhaust from fuel cell stack assemblies 20.

While this invention has been described in terms of preferred embodiments thereof, it is not intended to be so limited, but rather only to the extent set forth in the claims that follow.

We claim:

1. A method for operating a heater comprising a heater housing extending along a heater axis; a plurality of fuel cell stack assemblies disposed within said heater housing along said heater axis and having a plurality of fuel cells which convert chemical energy from a fuel cell fuel into heat and electricity through a chemical reaction with a fuel cell oxidizing agent; and a plurality of combustors disposed within said heater housing along said heater axis, said method comprising:

supplying a combustor fuel to said plurality of combustors;

combusting said combustor fuel to produce a heated combustor exhaust when said plurality of fuel cell stack assemblies are at an inactive temperature where said plurality of fuel cell stack assemblies are substantially electrochemically inactive; and using said heated combustor exhaust to elevate the temperature of said plurality of fuel cell stack assemblies from said inactive temperature to an active temperature where said plurality of fuel cell stack assemblies are electrochemically actives;

wherein said step of using said heated combustor exhaust to elevate the temperature of said plurality of fuel cell stack assemblies comprises surrounding said plurality of fuel cell stack assemblies with said heated combustor exhaust, thereby directly heating said plurality of fuel cell stack assemblies.

2. A method as in claim 1 wherein said heater housing extends from a first end to a second end, said method further comprising:

supplying said combustor fuel having a turbulent flame velocity to each one of said plurality of combustors at a flow rate that produces a fuel velocity of said combustor fuel that is less than said turbulent flame velocity; and using an igniter and said combustor fuel to initiate a flame at said first end of said heater housing.

3. A method as in claim 2 further comprising propagating said flame to said second end of said heater housing, thereby initiating combustion in each of said plurality of combustors.

4. A method as in claim 3 wherein said flame propagates to said second end of said heater housing at a rate of about 1 m/s to about 10 m/s.

5. A method as in claim 3 further comprising increasing said flow rate after combustion has been initiated in each one of said plurality of combustors.

6. A method for operating a heater comprising a heater housing extending along a heater axis from a first end to a second end; a plurality of combustors disposed within said heater housing along said heater axis; and an igniter, said method comprising:

supplying a combustor fuel having a turbulent flame velocity to each one of said plurality of combustors at a flow rate that produces a fuel velocity of said combustor fuel that is less than said turbulent flame velocity; and using said igniter and said combustor fuel to initiate a flame at said first end of said heater housing.

7. A method as in claim 6 further comprising propagating said flame to said second end of said heater housing, thereby initiating combustion in each of said plurality of combustors.

8. A method as in claim 7 wherein said flame propagates to said second end of said heater housing at a rate of about 1 m/s to about 10 m/s.

9. A method as in claim 7 further comprising increasing said flow rate after combustion has been initiated in each one of said plurality of combustors.

10. A method as in claim 7 wherein said heater further comprises a plurality of fuel cell stack assemblies disposed within said heater housing and having a plurality of fuel cells which convert chemical energy from a fuel cell fuel into heat and electricity through a chemical reaction with a fuel cell oxidizing agent, said method further comprising using said plurality of combustors to elevate the temperature of said plurality of fuel cell stack assemblies to be electrochemically active.

* * * * *